US012597002B2

(12) United States Patent
Schlicher et al.

(10) Patent No.: US 12,597,002 B2
(45) Date of Patent: Apr. 7, 2026

(54) METHOD, SYSTEM AND COMPUTER PROGRAM PRODUCT FOR COLLATERALIZING NON-FUNGIBLE TOKENS

(71) Applicant: AVC Innovations LLC, Spearfish, SD (US)

(72) Inventors: Bob G. Schlicher, Knoxville, TX (US); David J. Todd, Spearfish, SD (US); Niels C. Skjoldager, Seminole, FL (US); Shaikha Dheya Ebrahim Al Khalifa, Manama (BH)

(73) Assignee: AVC Innovations LLC, Spearfish, SD (US)

( * ) Notice: Subject to any disclaimer, the term of this patent is extended or adjusted under 35 U.S.C. 154(b) by 14 days.

(21) Appl. No.: 18/600,585

(22) Filed: Mar. 8, 2024

(65) Prior Publication Data

US 2025/0021955 A1      Jan. 16, 2025

Related U.S. Application Data

(60) Provisional application No. 63/526,843, filed on Jul. 14, 2023.

(51) Int. Cl.
  *G06Q 20/12* (2012.01)
  *G06Q 20/40* (2012.01)
  *G06Q 40/03* (2023.01)

(52) U.S. Cl.
  CPC ......... *G06Q 20/123* (2013.01); *G06Q 20/401* (2013.01); *G06Q 40/03* (2023.01); *G06Q 2220/00* (2013.01)

(58) Field of Classification Search
  None
  See application file for complete search history.

(56) References Cited

U.S. PATENT DOCUMENTS 7,716,619 B2    5/2010  Braceras et al.
9,855,785 B1    1/2018  Nagelberg et al.
            (Continued)

FOREIGN PATENT DOCUMENTS

WO    WO-2023201359 A2 *  10/2023    ............... H04L 9/50
WO    WO-2023201360 A2 *  10/2023    ............... H04L 9/50

OTHER PUBLICATIONS

"ERC-1155: Multi Token Standard". Authors: Witek Radomski, Andrew Cooke, Philippe Castonguay, et al. Published: Jun. 17, 2018. https://eips.ethereum.org/EIPS/eip-1155 (Year: 2018).*

(Continued)

*Primary Examiner* — Ayal I. Sharon
(74) *Attorney, Agent, or Firm* — Reston Law Group, LLP; Ralph P. Albrecht

(57)          ABSTRACT

A method of creating a SMARTPASS with computed estimated value including, a SmartHub computer processor system and data network, method including: receiving electronic requests to validate/authorize members and a purchase reporting request from a buyer and a financing request from a supplier engaged in a trade transaction over the network; determining if the electronic requests from the buyer and supplier are authorized, if so, creating the SMARTPASS with computed estimated value on the purchase reporting request; saving/minting the SMARTPASS as a non-fungible token, assigning an initial NFT value; computing the estimated value, tariff, taxes, or other fees; updating a database of the SMARTPASS, NFT, and initial NFT value with updated value; determining if financing requested, and if so: posting an NFT proxy to a second blockchain public NFT repository, notifying parties of financing options, and notifying FinTech, DeFi or decentralized Lenders; or if not notifying FinTech, DeFi or decentralized Lenders.

20 Claims, 4 Drawing Sheets

(56) References Cited

U.S. PATENT DOCUMENTS

Figure 1:
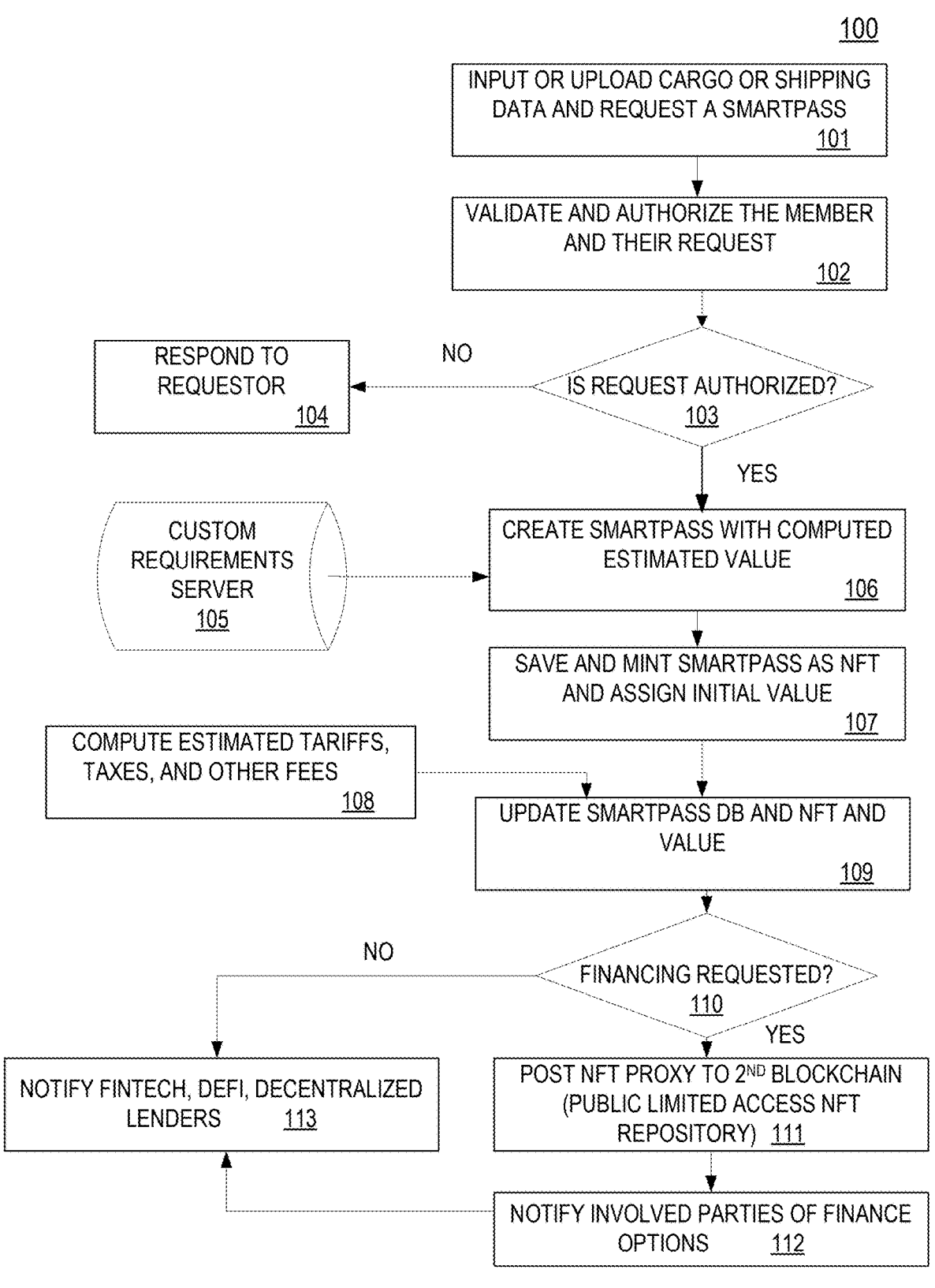

| | | | |
|---|---|---|---|
| 10,505,726 B1 | 12/2019 | Andon et al. | |
| 10,540,654 B1 | 1/2020 | James et al. | |
| 10,614,661 B2 | 4/2020 | Doney et al. | |
| 10,789,239 B2 | 9/2020 | Ventura et al. | |
| 10,951,409 B2 | 3/2021 | Konda et al. | |
| 10,972,274 B2 | 4/2021 | Redpath et al. | |
| 10,991,185 B1 | 4/2021 | Luthra et al. | |
| 11,038,718 B2 | 6/2021 | Simons | |
| 11,048,788 B2 | 6/2021 | Witchey et al. | |
| 11,070,564 B2 | 7/2021 | McIver et al. | |
| 11,138,580 B1 | 10/2021 | Koch | |
| 11,170,092 B1 | 11/2021 | Liang | |
| 11,171,782 B2 | 11/2021 | Tang et al. | |
| 11,200,569 B1 | 12/2021 | James et al. | |
| 11,979,490 B2 * | 5/2024 | Basu | G06Q 20/223 |
| 12,182,204 B2 * | 12/2024 | Tran | G06Q 20/321 |
| 12,190,384 B2 * | 1/2025 | Patton | G06F 16/2358 |
| 12,288,261 B2 * | 4/2025 | Patton | H04L 9/3239 |
| 12,299,743 B2 * | 5/2025 | Patton | H04L 9/50 |

| | | | |
|---|---|---|---|
| 2004/0221162 A1 | 11/2004 | Kongtcheu | |
| 2009/0077386 A1 | 3/2009 | Simonian | |
| 2016/0283920 A1 | 9/2016 | Fisher et al. | |
| 2017/0046664 A1 | 2/2017 | Haldenby et al. | |
| 2019/0130416 A1 | 5/2019 | Boudville et al. | |
| 2019/0164157 A1 * | 5/2019 | Balaraman | G06Q 20/36 |
| 2019/0279197 A1 | 9/2019 | Wright et al. | |
| 2020/0280444 A1 | 9/2020 | Tang et al. | |
| 2020/0294128 A1 | 9/2020 | Cella | |
| 2021/0256070 A1 * | 8/2021 | Tran | G06F 16/9536 |
| 2022/0058633 A1 | 2/2022 | Yantis et al. | |
| 2022/0173893 A1 * | 6/2022 | Basu | H04L 9/3247 |
| 2022/0253868 A1 | 8/2022 | Scarseli | |
| 2023/0079195 A1 * | 3/2023 | Matheson | G06Q 20/0655 705/44 |
| 2024/0412210 A1 * | 12/2024 | Tai | G06Q 20/1235 |
| 2025/0053975 A1 * | 2/2025 | Tai | G06Q 30/06 |

OTHER PUBLICATIONS

ISR & WO from PCT/US 24/ 19448 with four references.

* cited by examiner

METHOD, SYSTEM AND COMPUTER PROGRAM PRODUCT FOR COLLATERALIZING NON-FUNGIBLE TOKENS

BACKGROUND OF THE DISCLOSURE

Field of the Disclosure

This present disclosure relates generally to blockchains, and more particularly to non-fungible tokens.

Description of the Related Art

The reader is directed to "Digital Pass VERIFICATION Systems and Methods," to Luthra, et al., U.S. Pat. No. 10,991,185, issued Apr. 27, 2021 (U.S. patent application Ser. No. 17/068,599, filed Oct. 12, 2020), the contents of which is incorporated herein by reference in its entirety.

The reader is directed to "System and Method for Providing Cryptographically Secured Digital Assets," to Andon, et al., U.S. Pat. No. 10,505,726 B1, issued Dec. 10, 2019), the contents of which is incorporated herein by reference in its entirety.

The reader is directed to "System, method and program product for generating and utilizing stable value digital assets," James, et al., U.S. Pat. No. 10,540,654 B1, issued Jan. 21, 2020), the contents of which is incorporated herein by reference in its entirety.

The reader is directed to "System, method and program product for making payments using fiat-backed digital assets," to James, et al., U.S. Pat. No. 11,200,569 B1, issued Dec. 14, 2021), the contents of which is incorporated herein by reference in its entirety.

The reader is directed to "Methods and systems for verifying token-based actions on distributed ledger based networks through the use of zero-knowledge proofs," to Konda et al., U.S. Pat. No. 10,951,409, issued Mar. 16, 2021), the contents of which is incorporated herein by reference in its entirety.

The reader is directed to "Systems and methods for peer-to-peer exchanges of non-fungible digital assets," to Koch, Rudy, U.S. Pat. No. 11,138,580 B1, issued Oct. 5, 2021), the contents of which is incorporated herein by reference in its entirety.

The reader is directed to "Method, apparatus, and computer-readable medium for transaction management spanning multiple heterogeneous computing networks," to Simons, Jordan, U.S. Pat. No. 11,038,718 B2, issued Jun. 15, 2021), the contents of which is incorporated herein by reference in its entirety.

The reader is directed to "Management of virtual goods in distributed multi-ledger gambling architecture," to Doney et al., U.S. Pat. No. 10,614,661 B2, issued Apr. 7, 2020), the contents of which is incorporated herein by reference in its entirety.

SUMMARY OF THE INVENTION

According to one example embodiment, a computer implemented method of processing creating a SMARTPASS with an initial data state and computed estimated value may include, in one embodiment, at least one electronic computer processor coupled to at least one electronic memory storage device and coupled via at least one communications interface to at least one data communications network, the method may include: electronically receiving, by the at least one electronic computer processor of a SmartHub system, at least two electronic requests to validate and authorize members and at least one purchase reporting request from a buyer party device and at least one financing request from a supplier party device both engaged in a trade transaction over the at least one data communications network; electronically determining, by the at least one electronic computer processor, if the at least one electronic request from a buyer device and one electronic request from a supplier device are authorized and if so, performing a plurality of processing instructions, which may include at least one or more of: creating, by the at least one electronic computer processor, the SMARTPASS with computed estimated value on the purchase reporting request; saving and minting, by the at least one electronic computer processor, the SMARTPASS as at least one non-fungible token (NFT), and assigning, by the at least one electronic computer processor, an initial NFT value; computing by the at least one electronic computer processor, the estimated value; computing, by the at least one electronic computer processor, at least one or more of estimated tariff, taxes, or other fees; updating, by the at least one electronic computer processor, a database (DB) of the SMARTPASS, the at least one NFT, and the initial NFT value with an updated NFT value; determining if financing is requested, and if financing is determined to be requested, then performing: a) posting an NFT proxy to a second blockchain public limited access NFT repository, b) notifying involved parties of financing options, and c) notifying FinTech, DeFi and decentralized Lenders; or if financing is not requested then notifying FinTech, DeFi and decentralized Lenders.

According to another example embodiment, a system of processing creating a SMARTPASS with an initial data state and computed estimated value, the system may include, e.g., but not limited to: at least one electronic computer processor of at least one SmartHub, coupled to at least one electronic memory storage device and coupled via at least one communications interface, coupled to at least one data communications network, the system comprising wherein said at least one electronic computer processor may be configured to: electronically receive at least two electronic requests to validate and authorize members and at least one purchase reporting request from a buyer party device and one financing request from a supplier party device both engaged in a trade transaction over the at least one data communications network; electronically determine if the at least one electronic request from a buyer party device and one electronic request from a supplier party device are authorized and if so, perform a plurality of processing instructions comprising at least one or more of configuring the at least one electronic computer processor to be configured to: create the SMARTPASS with an initial data state and computed estimated value on the purchase reporting request; save and mint the SMARTPASS as at least one non-fungible token (NFT), and assign an initial NFT value; compute at least the estimated value on the purchase reporting request; compute at least one or more of an estimated tariff, tax, or other fees; update a database (DB) of the SMARTPASS, the at least one NFT, and the initial NFT value with an updated NFT value; determine if financing is requested, and if financing is determined to be requested, then may perform: a) post an NFT proxy to a second blockchain public limited access NFT repository, b) notify involved parties of financing options, and c) notify FinTech, DeFi and decentralized Lenders; or if financing is not requested then notify FinTech, DeFi and decentralized Lenders.

According to yet another example embodiment, a computer program product may be embodied on a computer accessible nontransitory storage medium, including at least one instruction, which when executed on at least one processor may perform a method of processing creating a SMARTPASS with an initial data state and computed estimated value, which may include: electronically receiving at least two electronic requests to validate and authorize members and at least one purchase reporting request from a buyer party device and at least one financing request from a supplier party device over the at least one data communications network; electronically determining if the at least one electronic request is authorized and if so, performing a plurality of processing instructions comprising at least one or more of: creating the SMARTPASS with an initial data state and computed estimated value; saving and minting the SMARTPASS as at least one non-fungible token (NFT), and assigning, by the at least one electronic computer processor, an initial NFT value; computing at least the estimated value on the purchase reporting request; computing at least one or more of estimated tariff, taxes, or other fees; updating a database (DB) of the SMARTPASS, the at least one NFT, and the initial data state and initial NFT value with an updated NFT value and updated data state; determining if financing is requested, and if financing is determined to be requested, then performing: a) posting an NFT proxy to a second blockchain public limited access NFT repository, b) notifying involved parties of financing options, and c) notifying FinTech, DeFi and decentralized Lenders; or if financing is not requested then notifying FinTech, DeFi and decentralized Lenders.

Example embodiments of the present disclosure may be directed to a method of automating computation for valuation of a nonfungible token (NFT) based on data and information in documents uploaded to an example computing system, according to one example embodiment. The data and documents may be stored in an example data repository related to the example private blockchain called off-chain data storage, according to an example embodiment. A proxy of the collateralized NFT may be transmitted to an example public blockchain for financial institutions, especially digital finance institutions, and may provide financial instruments for an example transaction in supplying goods or services within a supply chain, according to an example embodiment.

According to one example embodiment, the emergence of new digital technologies may transform conventional methods for movement of goods and services through supply chain and this invention incorporates a new technology that may be coupled with providing access to digital financing, according to one example embodiment. Decentralized financing may provide access to many financing options without the inefficiencies of administration of traditional banking, according to one example embodiment.

However, according to one example embodiment, the cost to the supplier for decentralized financing may be higher, and in most cases, with a loan at 50% value of the digital asset or NFT, annualized interest rates could range from 20-80%, according to one example embodiment. And the costs to borrowers may be at the discretion of the lender, with mutually agreed upon terms, according to one example embodiment. The confidence and certainty placed in the collateral can create a more competitive market among the lending institutions resulting in a lower cost for the borrower, according to one example embodiment.

This certainty and confidence may be developed through computing a valuation for the collateral NFT using a bound and pledge amount, according to one example embodiment.

In this present invention, according to one example embodiment, the process and systems are explained in transforming a digital asset into a collateralized NFT, according to one example embodiment. Furthermore, this invention, according to one example embodiment, may eliminate inefficiencies, increase competitiveness, and reduce costs and anxiety in the marketplace, according to one example embodiment. This invention, according to one example embodiment, can be applied for any digital asset with an attached value seeking financing. In this embodiment, the supply chain for a product, according to one example embodiment, that may transit through customs may be used, according to one example embodiment. More specifically, this invention, according to one example embodiment, may include creating an NFT sold under the trademark SMARTPASS and a private system with the blockchain sold under the trademark SMARTHUB, according to one example embodiment.

Supply chain financing, according to one example embodiment, may provide companies, institutions, and individuals an option to better manage their liquidity and working capital, according to one example embodiment. The principal aspects for supply chain financing, according to one example embodiment, may include the platform and the external finance provider. In ideal scenarios, the finance provider, according to one example embodiment, may settle the supplier's invoices in advance of the maturity date at a lower financing cost than the cost of the supplier's own funds, according to one example embodiment. In short, supply chain finance may be like a cash advance and the options available to the seller can be more favorable based on the credit rating of the seller, the company, or institution seeking the finance, according to one example embodiment. Collateral for the financing, according to one example embodiment, may be an asset that a borrower proposes to serve as security for a lender to loan money, more specifically, according to one example embodiment the collateral may secure repayment of the loan and protection against default of the borrower, according to one example embodiment.

In the traditional processing system for supply chain financing, for example, according to one example embodiment, a company may need a widget for the finished product and may find a seller that can produce the widget, according to one example embodiment. The seller, according to one example embodiment, who may also be called the supplier, may produce an invoice to the company for cost of manufacturing and delivering the widget, according to one example embodiment, plus any other expenses that the seller deems necessary, according to one example embodiment. The company, according to one example embodiment, hereinafter termed the buyer, may approve the invoice for payment, according to one example embodiment. The buyer, according to one example embodiment, may confirm to the buyer's financial institution or lender that the buyer has approved the invoice for payment, according to one example embodiment. The seller or supplier, according to one example embodiment, may receive the value or funding (minus a small fee) from the lender, because the lender, according to one example embodiment, may have negotiated with the buyer to pay the value later with interest or other fees, according to one example embodiment. When the payment is due, according to one example embodiment, the buyer may pay the lender/financial institution, according to one example embodiment. In this scenario, according to one example embodiment, the seller or supplier may receive payment within days instead of the standard payment due date of ninety (90), one hundred twenty (120), or more days, according to one example embodiment. The buyer, according to one example embodiment, may benefit because the buyer's working capital may not be impacted until the payment terms with the lender are due, according to one example embodiment, which could be extended form the seller's date.

In the examples disclosed herein, a person or entity, referred to as a user, according to one example embodiment, who manufactures, sells, or distributes the assets and seeks to obtain financial options is referred to herein as seller or supplier, according to one example embodiment. According to one example embodiment, the generation of a SMART-PASS, which may also be referred to as, e.g., but not limited to, an electronic pass, a digital pass, an electronic pharma pass, or a pass card, etc., according to one example embodiment. According to one example embodiment, in a trade arrangement, the recipient of the goods, data, or assets, referred to herein as buyer, can be, e.g., but not limited to, a person, an organization, company, or entity, etc., according to one example embodiment. A SMARTPASS, according to one example embodiment, may be designed to improve the shipment efficiency through customs processing and may provide the seller or supplier with financial options that are delivered more readily than traditional financing by using decentralized financing options, according to one example embodiment.

Decentralized Finance (DeFi), according to one example embodiment, may be based on an example illustrated block-chain technology with smart contract as an operating component, according to one example embodiment. DeFi, according to one example embodiment, may offer users complete transparency and access to an ecosystem of financial applications without involving a third-party, according to one example embodiment. These fintech applications, according to one example embodiment, may be held by defi companies that are on public blockchains, such as, e.g., but not limited to, ETHEREUM, etc., according to one example embodiment. DeFi, according to one example embodiment, may be a global, peer-to-peer system that is not routed through a centralized system, thereby providing speed in delivering finance more readily that traditional banking and lending institutions, according to one example embodiment. In most cases, cryptocurrency, according to one example embodiment, is the collateral. In this present disclosure, the collateral, according to one example embodiment, is the SMARTPASS, a nonfungible token (NFT), with its value determined based on goods for transit, according to one example embodiment.

According to one example embodiment, SMARTPASS, which is a digital card, may encode the trade arrangement between the buyer and the seller for a shipment that may traverse through one or more of these entities such as, e.g., but not limited to, including: trade ports, shipper facilities, modal transports, customs clearances, customs operations, warehouses, or financial lending institution, etc., according to one example embodiment.

Because the SMARTPASS is a nonfungible token, a user can create the SMARTPASS using a Graphical User Interface (GUI), according to one example embodiment, operating on any type of platform of mobile, desktop, laptop, console, or tablet including, e.g., but not limited to, through a Web-browser or an application, or application program, etc., according to one example embodiment. Because the SMARTPASS, according to one example embodiment, may encompass the trade arrangement between the buyer and seller, the SMARTPASS, according to one example embodiment, can be created after the trade arrangement is agreed upon and, according to one example embodiment, may be prior to product reaching customs for clearance or delivery to the intended entity, according to one example embodiment.

A SMARTPASS NFT, according to one example embodiment, may be created within the SMARTHUB System; the System, according to one example embodiment, may include being configured to receive a request for a new nonfungible token, over a distributed computing network from a remote computing node, according to one example embodiment. The NFT, according to one example embodiment, may include, e.g., but not limited to, a unique identifier, at least one metadata element, according to one example embodiment. The System, according to one example embodiment, may include one or more of the following, e.g., but not limited to,: 1) a private blockchain 2) an offchain repository for storage of digital data and documents, and/or 3) record for SMARTPASS NFTs, according to one example embodiment. And a proxy of the NFTs, according to one example embodiment, may be recorded on public distributed ledger, according to one example embodiment, and may be minted.

SMARTPASS NFTs, according to one example embodiment, may be created and saved to the blockchain, for example with the standard ERC-1155 Non-fungible token specification, according to one example embodiment. A public blockchain, according to one example embodiment, may be operatively connected, or coupled to the SMART-HUB System in which the proxy SMARTPASS NFT, according to one example embodiment may be stored. On the public distributed ledger, the unique identifier for the SMARTPASS NFT may be recorded, according to one example embodiment, on a new block, and the blockchain address may be verified and monitored for any transactions, according to one example embodiment.

The value of the NFT, according to one example embodiment, may not fluctuate as it is collateralized to the invoice and agreed upon terms between the buyer and seller, according to one example embodiment.

According to one example embodiment, the method may include where, the supplier party device and the seller party device may include at least one or more of: a same device; or different devices.

According to one example embodiment, the method may further include: electronically providing by a custom requirements server data to be used in said creating.

According to one example embodiment, the method may include electronically receiving of said at least one financing request from the seller from said seller party device, may include at least one or more of: electronically receiving said at least one financing request from said supplier party device at said SmartHub system; or electronically receiving a request for a collateralized NFT from said supplier party device at said Smarthub system.

According to one example embodiment, the method may further include at least one or more of: electronically recording, by said SmartHub system, a proxy NFT to a public blockchain ledger; electronically notifying, by said Smart-Hub system, digital financial services of said SMARTPASS NFT; electronically notifying, by said SmartHub system, said buyer party device of said SMARTPASS NFT; or electronically requesting early payment, by said SmartHub system, from said buyer party device; or electronically receiving a validation of said SMARTPASS NFT, by said SmartHub system, from the digital financial services.

According to one example embodiment, the system may include where, the supplier party device and the seller party device may include at least one or more of: a same device; or different devices.

According to one example embodiment, the system may further include where the processor is configured to electronically provide by a custom requirements server data to be used in said creating.

According to one example embodiment, the system may include where the processor configured to electronically receive of said at least one financing request from the seller from said seller party device, may include wherein the processor is configured to at least one or more of: electronically receive said at least one financing request from said supplier party device at said SmartHub system; or electronically receive a request for a collateralized NFT from said supplier party device at said Smarthub system.

According to one example embodiment, the system may further include where the processor is configured to at least one or more of: electronically record, by said SmartHub system, a proxy NFT to a public blockchain ledger; electronically notify, by said SmartHub system, digital financial services of said SMARTPASS NFT; electronically notify, by said SmartHub system, said buyer party device of said SMARTPASS NFT; or electronically request early payment, by said SmartHub system, from said buyer party device; or electronically receive a validation of said SMARTPASS NFT, by said SmartHub system, from the digital financial services.

According to one example embodiment, the computer program product may include where the method may include where the supplier party device and the seller party device may include at least one or more of: a same device; or different devices.

According to one example embodiment, the computer program product may include where the method may further include electronically providing by a custom requirements server data to be used in said creating.

According to one example embodiment, the computer program product may include where the method may include where the electronically receiving of said at least one financing request from the seller from said seller party device, may include at least one or more of: electronically receiving said at least one financing request from said supplier party device at said SmartHub system; or electronically receiving a request for a collateralized NFT from said supplier party device at said Smarthub system.

According to one example embodiment, the computer program product may include where the method may further include at least one or more of: electronically recording, by said SmartHub system, a proxy NFT to a public blockchain ledger; electronically notifying, by said SmartHub system, digital financial services of said SMARTPASS NFT; electronically notifying, by said SmartHub system, said buyer party device of said SMARTPASS NFT; or electronically requesting early payment, by said SmartHub system, from said buyer party device; or electronically receiving a validation of said SMARTPASS NFT, by said SmartHub system, from the digital financial services.

This disclosure, according to example embodiments may expressly include any and all combinations and sub-combinations, permutations and combinations, of any and all example elements and/or features presented above and below.

BRIEF DESCRIPTION OF THE VARIOUS EXAMPLE VIEWS OF THE DRAWINGS

Figure 2:
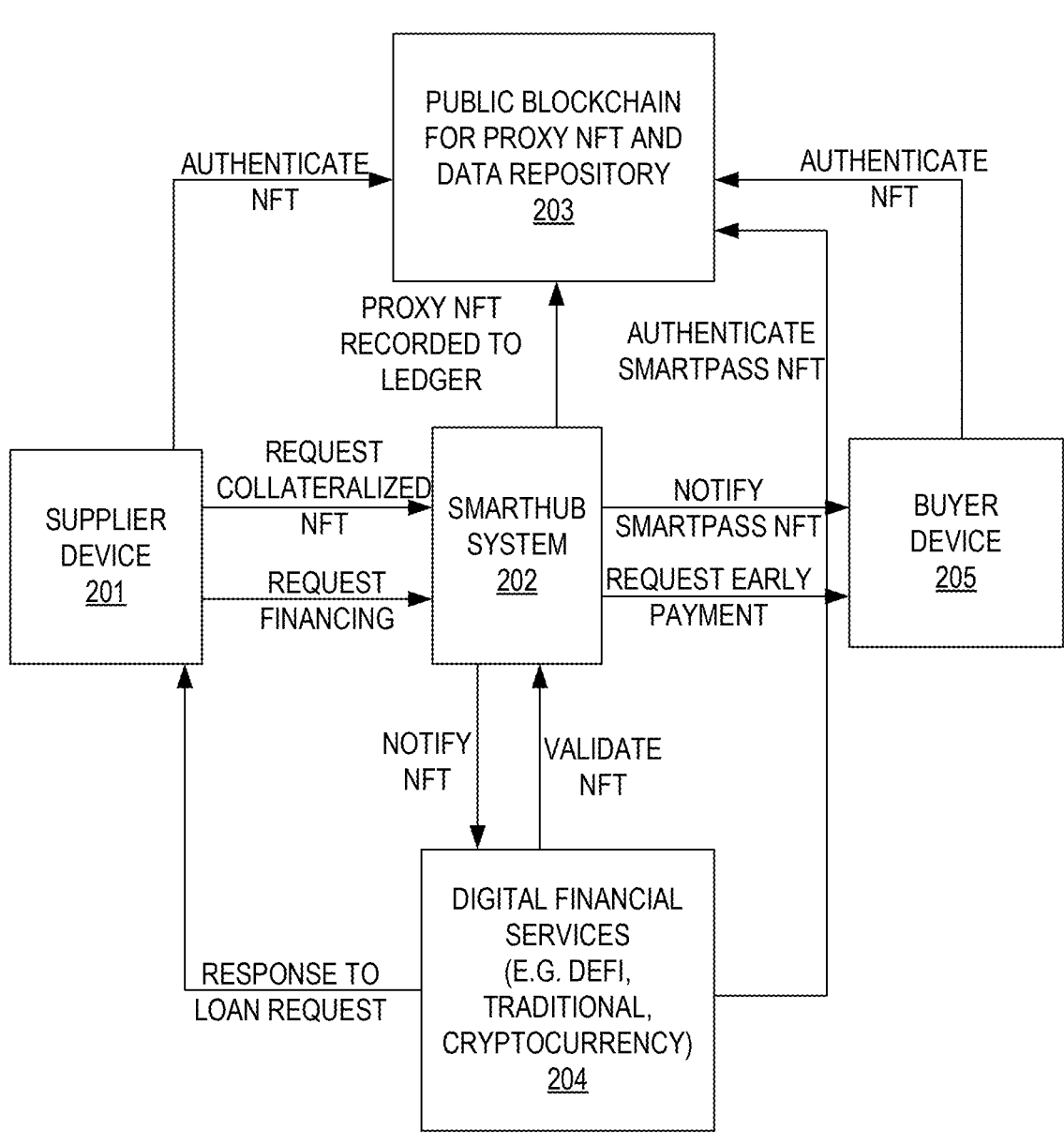

This present disclosure will be fully understood with reference to the following detailed description when taken in conjunction with the figures, herein:

FIG. 1 is an example embodiment of an example flowchart of example business logic as may be used in an example assigning of the valuation to create a collateralized nonfungible token (NFT), according to one example embodiment, and the example requests, which may be made for financing options on an example public blockchain for example decentralized finance services, as well as, an example early payment through an example private blockchain, according to one example embodiment;

FIG. 2 depicts an example relationship between the various members of the example private and public blockchains and various example methodologies executed under the event based smart contracts, according to one example embodiment.

Figure 3:
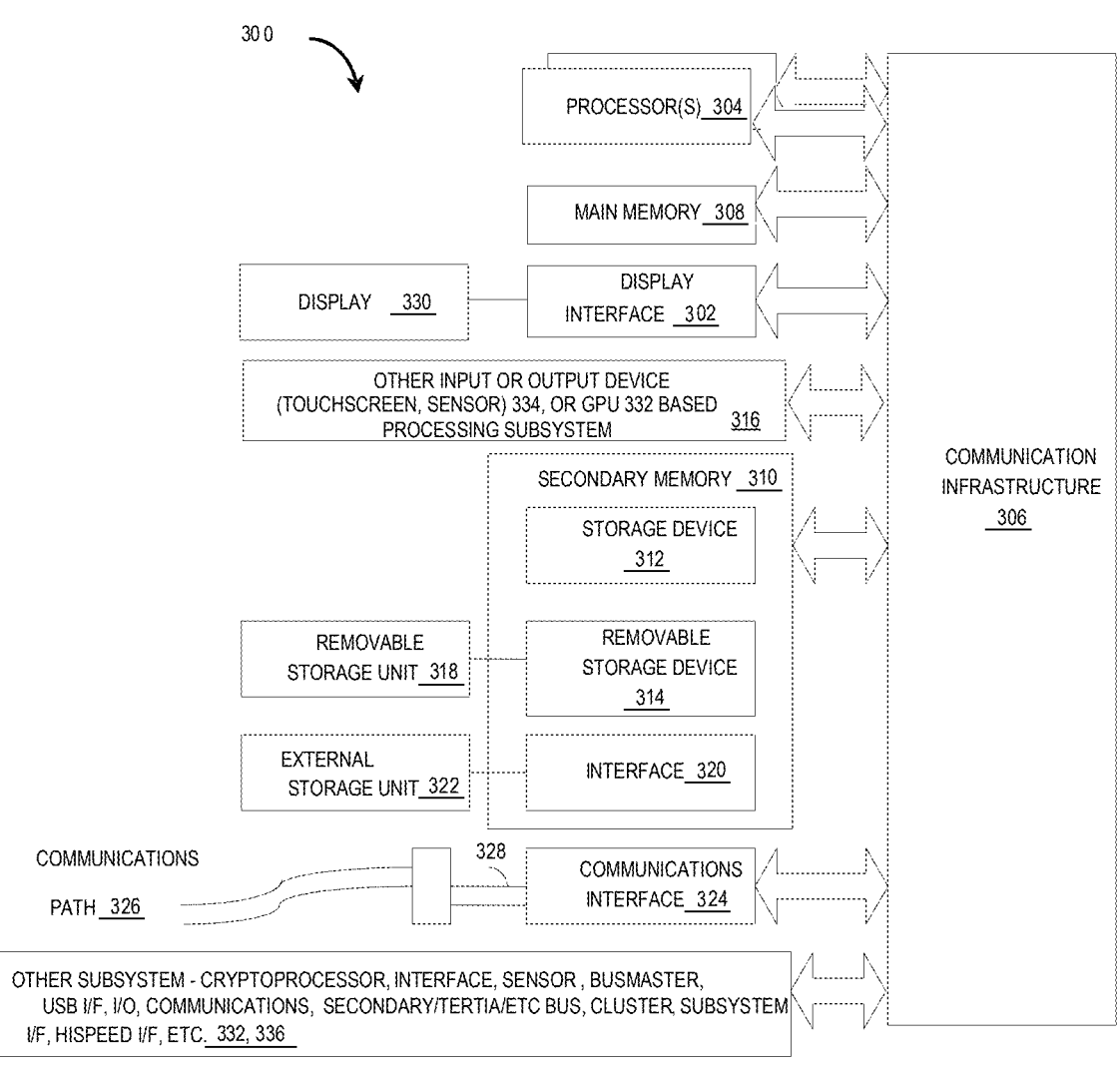
Figure 4:
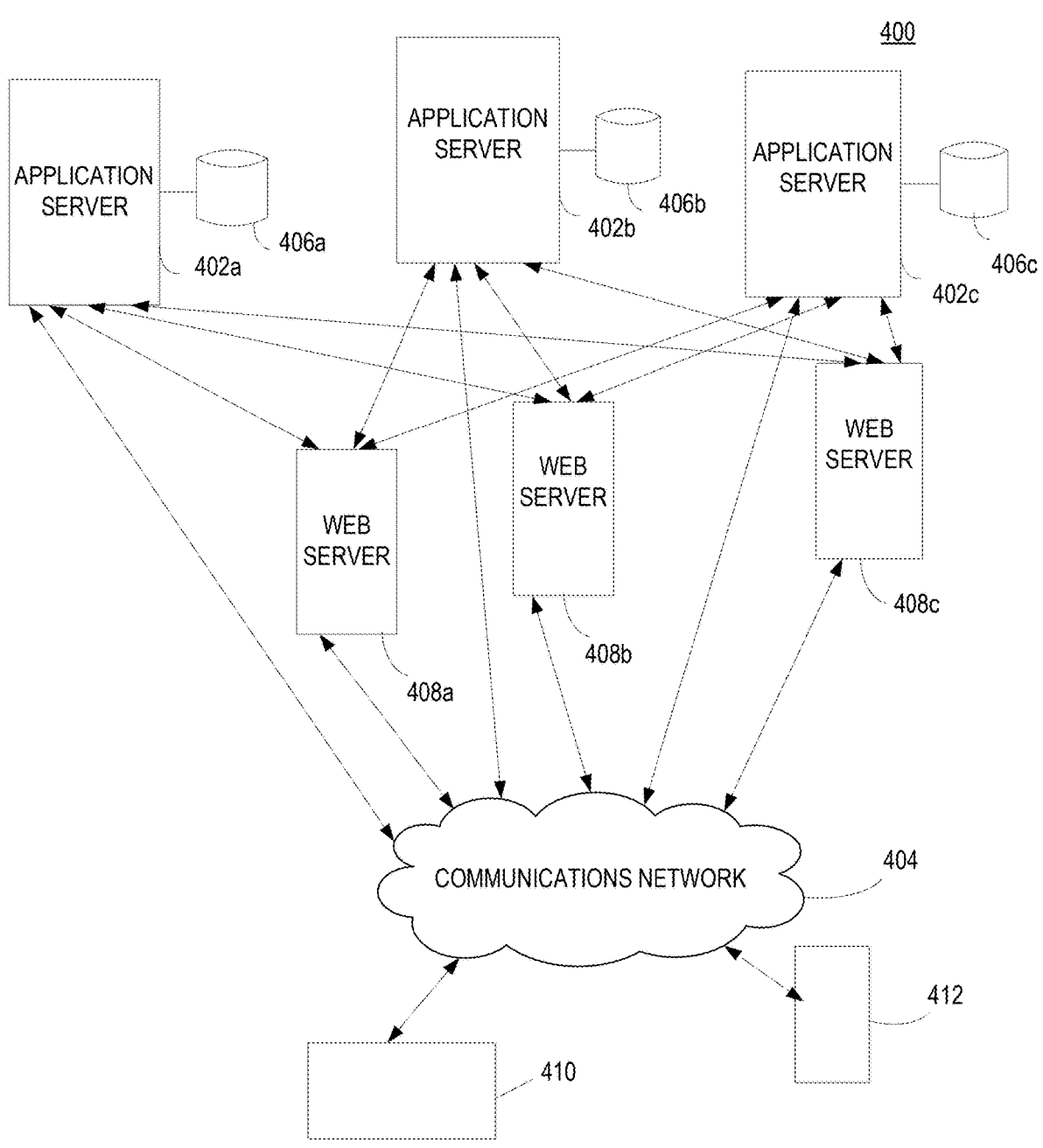

FIG. 3 depicts an example embodiment of an example component level example hardware architecture for an example computing device as may be used for any of various example hardware subsystem components of an example system, according to one example embodiment; and FIG. 4 depicts an example embodiment illustrating an example system level hardware architecture for an example application server, web server embodiment of an example service provider system for providing an example software architecture of various example subsystem components of an example networking system, which may be used to implement, according to one example embodiment.

DETAILED DESCRIPTION OF THE INVENTION

The various embodiments of the invention described herein should not be limited to the description, even with reference to the accompanying figures and drawings depicted, but only with respect to the claims. The invention may be embodied in different forms and should not be restricted as set forth here.

The reader is directed to "Platform for Creating and Using Actionable Non-fungible Tokens," to, Rich et al., U.S. Patent Application No. 62/796,469), filed Jan. 24, 2019, (related to U.S. Pat. Nos. 11,301,460, issued Apr. 12, 2022, and 12,038,911 B2, issued Jul. 16, 2024), the contents of which is incorporated herein by reference in its entirety.

FIG. 1 is an example embodiment 100 of an example flowchart 100 of example business logic as may be used in an example assigning of the valuation to create a collateralized nonfungible token (NFT), according to one example embodiment, and the example requests, which may be made for financing options on an example public blockchain for example decentralized finance services, as well as, an example early payment through an example private blockchain, according to one example embodiment.

According to an example embodiment, flow diagram 100 may begin with 101.

In 101, the flow diagram 100 may include, e.g., but is not limited to, inputting and/or uploading of cargo or shipping data and/or a request of a SMARTPASS, etc., according to one example embodiment. From 101, flow diagram 100 may continue with 102, according to one example embodiment.

In 102, the flow diagram 100 may include, e.g., but is not limited to, validating and authorizing a member and request, etc., according to one example embodiment. From 102, flow diagram 100 may continue with 103, according to one example embodiment.

In 103, the flow diagram 100 may include, e.g., but is not limited to, determining if a request is authorized, and if so then continuing with 106, or if not authorized then continuing with 104, etc., according to one example embodiment.

In 104, the flow diagram 100 may include, e.g., but is not limited to, responding to a requestor, and may allow for the requestor to take appropriate steps to seek authorization of its request, and in some cases may allow a reauthorization determination 103, etc., according to one example embodiment. From 104, flow diagram 100 may continue with 103, according to one example embodiment.

In 106, the flow diagram 100 may include, e.g., but is not limited to, creating a SMARTPASS with computed estimated value, according to one example embodiment. 106 may receive requirements from a Custom requirements server 105, etc., according to one example embodiment. From 106, flow diagram 100 may continue with 107, according to one example embodiment.

In 107, the flow diagram 100 may include, e.g., but is not limited to, saving and minting a SMARTPASS as an example nonfungible token (NFT) in a private blockchain, and may assign an initial value to the NFT, etc., according to one example embodiment. From 107, flow diagram 100 may continue with 109, according to one example embodiment.

In 108, flow diagram 100 may include, e.g., but not limited to, computing any estimated tariffs, taxes, and/or other fees, etc., according to one example embodiment. In one example embodiment, 108 may be triggered, e.g., by completion of 107 (not shown in figure), and/or may be performed in parallel with 107, according to example embodiments. From 108, flow diagram 100 may continue with 109, according to one example embodiment.

In 109, the flow diagram 100 may include, e.g., but is not limited to, updating the SMARTPASS database (DB), and may include updating the NFT, and/or the value of the NFT, using, e.g., but not limited to, the computed fee values from 108, and may provide updates to data storage accordingly, and/or revise the value of the NFT, etc., according to one example embodiment. From 109, flow diagram 100 may continue with 110, according to one example embodiment.

In 110, the flow diagram 100 may include, e.g., but is not limited to, determining if a financing is requested, and if so then continuing with 111, or if not requested then continuing with 113, according to one example embodiment.

In 111, the flow diagram 100 may include, e.g., but is not limited to, posting an NFT proxy to, e.g., but not limited to, a second (2$^{nd}$) blockchain, which may include, e.g., but not limited to, a public limited access NFT repository, etc., according to one example embodiment. From 111, flow diagram 100 may continue with 112, according to one example embodiment.

In 112, the flow diagram 100 may include, e.g., but is not limited to, notifying involved parties of, e.g., but not limited to, finance options, alternative lenders, etc., according to one example embodiment. From 112, flow diagram 100 may continue with 113, according to one example embodiment.

In 113, the flow diagram 100 may include, e.g., but is not limited to, notifying, e.g., one or more of, e.g., FinTech, DeFi, and/or decentralized lenders, etc., according to one example embodiment. From 113, flow diagram 100 may, in one example embodiment, end, according to one example embodiment.

The nonfungible token (NFT), according to an example embodiment, may be created within a private blockchain with access limited to designated members, according to an example embodiment; these members, according to an example embodiment, can have different roles within the platform such as, e.g., but not limited to, buyer, seller, intermediary, or an Internet of Things (IOT), et c., according to an example embodiment. In addition to the private blockchain, according to an example embodiment, the platform or system may include, e.g., but not limited to, various other components, according to an example embodiment, including, e.g., but not limited to, a repository, according to an example embodiment.

Referring to FIG. 1, an example trade arrangement, according to an example embodiment, between the seller/supplier and the buyer may be executed, according to an example embodiment, and an invoice may be generated by the supplier with costs and associated fees for, e.g., but not limited to, products, goods, or services, etc., according to an example embodiment. A member, according to an example embodiment, who may be a credentialed user, can input or upload cargo and shipping documents, including the invoice, to the private blockchain using a GUI as set forth in 101, according to an example embodiment. In one embodiment, an upload, according to an example embodiment, may occur during the member's session and in another embodiment, the document may be received from a credentialed third-party service, e.g., but not limited to, IoT sensor service, a logistics service, etc., according to an example embodiment.

And the Invoice, according to an example embodiment, may be a required document to create the SMARTPASS, because it may be the valuation of the trade agreement and may be used to collateralize the NFT, according to an example embodiment. Other document, according to an example embodiment, may be required, such as, e.g., but not limited to, a bill of lading, airway bill, purchase order from buyer, and container packing list, etc., according to an example embodiment. The required documents, according to an example embodiment, may vary based on the party who created the SMARTPASS, such as, e.g., but not limited to, using a SMARTPASS template, a SMARTPASS generator, a prescribed or mandatory SMARTPASS, or SMART-HUB graphical user interface to assign documents when SMARTPASS is formed, product type, country of origin, to name a few examples, according to an example embodiment. Only an authenticated member, according to an example embodiment, may be authorized to request the creation of an NFT, according to an example embodiment, which may be enabled through a user interface and the request verified by evaluating the member's credentials, according to an example embodiment, and in this embodiment the NFT may be called a SMARTPASS NFT as set forth in 102, according to an example embodiment. Authentication, according to an example embodiment, may occur when the credentials of the member may be compared to the qualifications outlined for access to the private blockchain as set forth in the determination of 103, according to an example embodiment. If the requestor does not have the appropriate credentials, according to an example embodiment, the request may be denied, and a response to that effect may be sent to the responder as shown at 104 and the process may be arrested until an authenticated member submits a request, according to an example embodiment. The smart contract, according to an example embodiment, may employ an example role-based access control, according to an example embodiment, to restrict entry to specified users at different levels as written in the programmable code, according to an example embodiment. In the creation of the SMARTPASS, according to an example embodiment, the graphical user interface (GUI), according to an example embodiment, may inform the user of these example mandatory documents, because a query may be made to the Customs Requirements Server, according to an example embodiment, which is communicated through the API as set forth in 105, according to an example embodiment. The Customs Requirements Server, according to an example embodiment, may respond with an example list of mandatory documents for customs import processing, according to an example embodiment.

The requirements as set forth in 105, according to an example embodiment, may be combined with the cargo and shipping data and documents as set forth in 101 and as illustrated in 106, according to an example embodiment, may result in creating a SMARTPASS with an assigned value as set forth in 106, according to an example embodiment. The value, according to an example embodiment, may be assigned reflecting, according to an example embodiment, the price of the invoice agreed to by the contractual parties or members, according to an example embodiment. This may become the initial value of the SMARTPASS NFT, according to an example embodiment, which may be saved and minted at that value as set forth in 107, according to an example embodiment. In this example, a SMARTPASS NFT, according to an example embodiment, may be created using the Ethereum Blockchain with the ERC-1155 on a private blockchain, according to an example embodiment, however other blockchains may be used, according to other example embodiments.

In this invention, according to an example embodiment, an option may be available for the NFT to include, according to an example embodiment, the costs of other fees and taxes usually incurred in movement of goods, according to an example embodiment. For example, these other fees can include, e.g., but not limited to, taxes, IncoTerms, tariffs, trade terms, and other charges, etc., according to an example embodiment. The fees may be calculated using a software code designed, for the SMARTPASS, with algorithms and equations using statistics and histories of fees for similarly situated trades of goods and services as set forth in 108, according to an example embodiment. The value of SMARTPASS NFT, according to an example embodiment, may be adjusted to include the additional calculated fees, according to an example embodiment. This new value, according to an example embodiment, may be saved and minted to create a new SMARTPASS NFT based on the same shipping documentation as set forth in 109, according to an example embodiment. Within the SMARTHUB repository, the member, according to an example embodiment, may have the discretion to select the amount of the value of the NFT for their request for financing—that may include, e.g., but not limited to, the invoice amount, the invoice amount plus the aforementioned fees, or a value less than these amounts, e.g. offering a discount to the invoice amount with terms, according to an example embodiment. A prompt, according to an example embodiment, may give the supplier the option to seek financing for the collateralized SMARTPASS NFT as provided in the business rules for the smart contract as set forth in 110, according to an example embodiment. In short, these new calculated values for the fees, according to an example embodiment, may be saved in the SMARTPASS NFT data structure along with the invoice data, according to an example embodiment. Therefore, with proper authorization, according to an example embodiment, the member may have the discretion to filter and/or select the data for their request for financing, according to an example embodiment. If financing is not sought, according to an example embodiment, the process may stop at a value being attached to create a collateralized NFT as set forth in 113, according to an example embodiment. The business rules in the smart contract, according to an example embodiment, that may be on the blockchain may transition to request financing from 110 to as set forth in 111, according to an example embodiment, a second blockchain may be used, if selected by the user, according to an example embodiment; and according to an example embodiment, it may be referred to as an example Limited Access Public NFT (LAPN) Repository. The Hedera Consensus Network and Token Service are examples of the LAPN repository, according to an example embodiment. According to an example embodiment, a copy of the collateralized SMARTPASS NFT with the computed values such as, e.g., but not limited to, taxes, fees, and the collateralized amount, etc., may be posted to the LAPN where it may be notarized and saved to that blockchain as set forth in 112, according to an example embodiment. In this manner, non-members of the SMARTHUB System, according to an example embodiment, and its private blockchain can access the SMARTPASS NFT, in order to perform their due diligence such as, e.g., but not limited to, prove its existence and values as computed by the SMARTPASS system, according to an example embodiment. While credentialed members, according to an example embodiment, can query the status and values of the SMARTPASS within the SMARTHUB system by API or on the LAPN Repository as set forth in 113, according to an example embodiment.

This proxy, according to an example embodiment, on the public blockchain, which is a copy of the NFT with all the data assigned to it, fees may be digitally signed by the SMARTHUB system and may be saved to the LAPN Repository, according to an example embodiment. And the copy that is saved to the LAPN, in another embodiment, maybe a link to the NFT stored in the SMARTHUB 11X, according to an example embodiment.

FIG. 2, according to an example embodiment, may define the interrelationships between the various example members of the transaction and their roles, according to an example embodiment. Although this present invention, according to an example embodiment, may provide two examples, according to an example embodiment, in obtaining financing, this not exhaustive of the variations for financing options, according to an example embodiment. One example is the supplier can request financing on the open market of lenders, according to an example embodiment, and another example is the supplier can request early payment from the buyer, according to an example embodiment.

The focal point is SMARTHUB System, according to an example embodiment, or another private system with its blockchain can be employed as set forth in 202, according to an example embodiment. Although, any member to SMARTHUB, according to an example embodiment, can upload data, shipping documents, the supplier requests from SMARTHUB for the invoice and associated costs to be transformed into a digital asset, which is minted into a NFT with the invoice and the associated costs as the collateral as set forth in 201, according to an example embodiment.

A record of the SMARTPASS NFT, according to an example embodiment, is created within the private blockchain and a proxy is transmitted to a public blockchain for access by registered members as set forth in 202, 203, according to an example embodiment. The access to the record, according to an example embodiment, is limited to credentialed members, who can confirm the authenticity and validate the NFT during their due diligence for providing financial services to the supplier as set forth in 203, according to an example embodiment.

After the proxy is posted to the LAPN, according to an example embodiment, the lenders, including traditional banking and decentralized financial institution, and cryptocurrency platforms, according to an example embodiment, are notified through various method including, e.g., but not limited to, email, posts on a forum, and messaging, etc., according to an example embodiment.

After concluding their due diligence, according to an example embodiment, lenders may send a message to the private blockchain for providing financial services in accordance with agreed upon loan terms as set forth in 204, according to an example embodiment. The mechanism for lenders, according to an example embodiment, is for those who intend to participate with the financing communicate through a message link to the API of the private blockchain, according to an example embodiment. The message link, according to an example embodiment can be a privately issued universal resource locator (URL) to the lender, it can be supplied in the LAPN notification, and it can be supplied in the proxy NFT data as set forth in 204, according to an example embodiment. In the second embodiment, the SMARTHUB, according to an example embodiment, may notify the Buyer via communications methods such as, e.g., but not limited to, email, messaging, forum, that invoice and associate costs have been transformed into a digital asset in the form of a NFT, after the NFT has been minted with its value that may indicate as invoice only and invoice plus associated fees as set forth in 205, etc., according to an example embodiment. When the supplier opts for early payment to the SMARTHUB, a notification prompt may be sent to the buyer on the private blockchain as set forth in 205, according to an example embodiment. The buyer can either accept or decline, according to an example embodiment, in which either answer may be transmitted to the SMARTHUB GUI and saved to the blockchain ledger associated with NFT and the answer is also packaged into a message that is sent through the notification system such as email to the requestor, according to an example embodiment. The SMARTHUB GUI may also, according to an example embodiment, display the answer to the user through updating its view of the data by querying the ledger through the smart contract, according to an example embodiment.

Credential institutions, according to an example embodiment, within the lending market may be provided with the location of the NFT and its associated documentation on both the private and public blockchains as set forth in 202, 203, according to an example embodiment. At either location, the institutions, according to an example embodiment, may only have access to the documents that serve as the collateral and any other documents the institutions may need for their due diligence or to complete a financing transaction (which has been worked through in the registration process, according to an example embodiment). The lenders, according to an example embodiment, may have the ability to engage directly with the supplier, however the collateral is only honored through the private blockchain, according to an example embodiment. The institution's response, according to an example embodiment, is transmitted to the SMARTHUB GUI, is transmitted through a secured link to the API to the NFT, according to an example embodiment. The API, according to an example embodiment, saves their response in the blockchain ledger associated with the NFT, according to one example embodiment. The SMARTHUB GUI, according to an example embodiment also may display the response data to the user through updating its view of the data by querying to the ledger, according to an example embodiment. This event, according to an example embodiment, may occur automatically from the business rules that are encoded within the smart contract, according to an example embodiment. Under the following circumstances, according to an example embodiment, the NFT is retired:

1) once the financing, according to an example embodiment, is provided to the Supplier from a DeFi institution or traditional lender, or cryptocurrency, 2) buyer provides early payment, or the Supplier decides to reject its request for financing or early payment, according to an example embodiment. The transaction is considered concluded, according to an example embodiment, and the NFT record is closed by assigning an indicator to the NFT record in the local blockchain and the second blockchain, according to an example embodiment. This conclusion occurs, funds are transferred to the supplier by a variety of mechanisms that may include, e.g., but not limited to, traditional ACH and wire transfers and non-traditional including cryptocurrency transfers through a cryptocurrency exchange sold under the trademark COINBASE or from the buyer, according to an example embodiment.

The SMARTPASS NFT and its proxy are locked from being used for any further financing for the goods and shipment or this particular transaction between the seller/supplier and buyer, according to an example embodiment.

FIG. 3 depicts an example embodiment of a hardware architecture block diagram 300 for an example computing or communications device as may be used for any of various example buyer devices, example seller devices, example financial institution devices, example nonfungible token (NFT) devices, notification and/or authentication devices, example SMARTHUB devices, cryptocurrency exchange devices, as well as example computing devices of users, mobile devices, network communication components, routers, gateways, etc., according to an example embodiment of the present invention.

FIG. 3 depicts an exemplary schematic block diagram 300 illustrating an exemplary computer/communications device hardware architecture as may be used in various exemplary components of an exemplary embodiment including user devices various example buyer devices, example seller devices, example financial institution devices, example nonfungible token (NFT) devices, notification and/or authentication devices, example SMARTHUB devices, cryptocurrency exchange devices, as well as example computing devices of users, mobile devices, network communication components, routers, gateways, etc., computer device(s), bank devices, merchant devices, payment service provider devices, other computing or communications devices, routers, application servers, web servers, cloud-based computing devices, communication devices, switches, routers, gateways, telephone devices, mobile devices, content servers, web servers, database servers and/or other application servers, end-user devices, operations center devices, client and/or server devices, network routers, gateways, access points, and the like, according to various exemplary embodiments.

FIG. 3 depicts an exemplary schematic block diagram 300 illustrating an exemplary computer/communications device hardware architecture as may be used in various exemplary components of an exemplary embodiment including mobile devices, wearables, cloud-based computing devices, content servers, web servers, database servers and/or other application servers, according to various exemplary embodiments.

Diagram 300 may include any of various exemplary computer systems as may be used as an external computer device, an internal and/or STB or SOC, a mobile device, a wearable, a client, or server, web server, application server, and/or any other of the computing devices included in the other drawings, according to various exemplary embodiments. FIG. 3 depicts an exemplary diagram 300 illustrating an exemplary computer/communications device hardware architecture as may be used in various components of exemplary embodiments of the present invention. FIG. 3 depicts an exemplary view 300 of exemplary computer systems such as those represented in FIGS. 1-2, 4, etc., including devices which may execute various modules, including components, systems, devices, computers, processors, mobile devices, routers, gateways, network devices, other computing and/or network devices, network monitoring and security operations data analysis computing devices which may execute various operating system and software components on such computing devices and/or subsystem devices and hardware/software modules as may be represented by devices implied by, or perform steps illustrated in various flowchart diagrams as illustrated in the figures by elements 101-113, 201-205, 300, 400, etc., as may be used in implementing an exemplary embodiment of the present invention. FIG. 3 depicts an exemplary embodiment of a computer system that may be used in computing devices including those shown and not shown, such as, e.g., but not limited to, service provider computing devices, SMART-HUB systems, buyer computing devices, supplier computing devices, digital financial services computing devices, public blockchain for proxy NFT computing devices, data repository processing and/or storage computing devices, network devices, communication devices, authentication devices, notification devices, requesting device, response devices, cryptocurrency exchange related devices, NFT related devices, traditional financial services and/or fiat currency processing computing devices, electronic funds transfer (EFT) related devices, network monitoring and analysis devices of example operations illustrated example environment 400, computing devices 300, devices, servers, application servers, web servers, other wearable and/or mobile devices, sensor capture devices, routers, gateways, data network communication equipment, according to an exemplary embodiment of the present invention. FIG. 3 depicts an exemplary embodiment of a computer system that may be used as client device, a server device (not shown), a network component, router, packet monitor/analyzer, server device, storage, and/or cloud based storage device, application servers, and/or web servers, etc. The present invention (or any part(s) or function(s) thereof) may be implemented using hardware, software, firmware, or a combination thereof and may be implemented in one or more computer systems or other processing systems. In fact, in one exemplary embodiment, the invention may be directed toward one or more computer systems capable of carrying out the functionality described herein. An example of a computer system 300 is shown in FIG. 3, depicting an exemplary embodiment of a block diagram of an exemplary computer system useful for implementing the present invention. Specifically, FIG. 3 illustrates an example computer 300, which in an exemplary embodiment may be, e.g., (but not limited to) a personal computer (PC) system running an operating system such as, e.g., (but not limited to) WINDOWS MOBILE™ for POCKET PC, or MICROSOFT® WINDOWS® NT/98/2000/XP/CE/7/8/10, etc. available from MICROSOFT® Corporation of Redmond, Wash, U.S.A., SOLARIS® from SUN® Microsystems of Santa Clara, Calif, U.S.A, OS/2 from IBM® Corporation of Armonk, N.Y, U.S.A, Mac/OS, Mac OSX, iOS, from APPLE® Corporation of Cupertino, Calif, U.S.A, etc., or any of various versions of UNIX® (a trademark of the Open Group of San Francisco, Calif, USA) including, e.g., LINUX®, UBUNTU, HPUX®, IBM AIX®, and SCO/UNIX®, etc., ANDROID, Android OS is available from Google, JAVA from Oracle, etc. However, the invention may not be limited to these platforms. Instead, the invention may be implemented on any appropriate computer system running any appropriate operating system. In one exemplary embodiment, the present invention may be implemented on a computer system operating as discussed herein. An exemplary computer system, computer 300 is shown in FIG. 3. Other components of the invention, such as, e.g., (but not limited to) a computing device, a communications device, a telephone, a personal digital assistant (PDA), a personal computer (PC), a handheld PC, client workstations, thin clients, thick clients, proxy servers, network communication servers, remote access devices, client computers, server computers, routers, web servers, data, media, audio, video, telephony or streaming technology servers, a tablet, a phone, a mobile phone, a cellular phone, a communications device, an iPhone, iOS, a smartphone, an iPad, a tablet based device, an ANDROID OS device, an iOS device, a Symbian based device, a Windows 8, 10, 11, etc., device, etc., may also be implemented using a computer such as that shown in FIG. 3.

The computer system 300 may include one or more processors, such as, e.g., but not limited to, processor(s) 304, which may include microprocessors, coprocessors, nanoprocessors, microcontrollers, systems on a chip (SOC), multiprocessor systems, parallel processors, CISC type processors, RISC type processors, POWER type processors, ARM-architecture processors, massively parallel processor, graphic processors (GPUs) 332, cryptographic processors such as, e.g., but not limited to, encryption/decryption processor 336, quantum computers, etc. The processor(s) 304 may be connected to a communication infrastructure 306 (e.g., but not limited to, a communications bus, crossover bar, or network, etc.). Various exemplary software embodiments may be described in terms of this exemplary computer system. After reading this description, it will become apparent to a person skilled in the relevant art(s) how to implement the invention using other computer systems and/or architectures.

Computer system 300 may include a display interface 302 that may forward, e.g., but not limited to, graphics, text, and other data, etc., from the communication infrastructure 306 (or from a frame buffer, etc., not shown) for display on the display unit 330, and/or GPU 332, and/or touchscreen 334, and/or other input or output, and/or input and output device, sensor-based device, etc.

The computer system 300 may also include, e.g., but may not be limited to, a main memory 308, random access memory (RAM), and a secondary memory 310, etc. The secondary memory 310 may include, for example, (but not limited to) a hard disk drive 312 and/or a removable storage drive2 314, representing a floppy diskette drive, a magnetic tape drive, an optical disk drive, a compact disk drive CD-ROM, DVD, Personal Cloud storage, redundant array of inexpensive disks (RAID) array, etc. The removable storage drive 314 may, e.g., but not limited to, read from and/or write to a removable storage unit 318 in a well-known manner. Removable storage unit 318, also called a program storage device or a computer program product, may represent, e.g., but not limited to, a floppy disk, magnetic tape, optical disk, compact disk, etc. which may be read from and written to by removable storage drive2 314. As will be appreciated, the removable storage unit 318 may include a computer usable storage medium having stored therein computer software and/or data.

In alternative exemplary embodiments, secondary memory 310 may include other similar devices for allowing computer programs or other instructions to be loaded into computer system 300. Such devices may include, for example, but not limited to, a removable storage unit 322 and an interface 320. Examples of such may include a program cartridge and cartridge interface (such as, e.g., but not limited to, those found in video game devices), a removable memory chip (such as, e.g., but not limited to, an erasable programmable read only memory (EPROM), or programmable read only memory (PROM) and associated socket, FLASH memory, application specific integrated circuits (ASICs), field programmable gate arrays (FPGAs), and/or other removable storage units 322 and interfaces 320, which may allow software and/or data to be transferred from the removable storage unit 322 to computer system 300.

The computing device 300 may also include a cloud-accessible or cloud-based processing and/or storage solution as may be available from Amazon Web Services available from Amazon of Seattle, WA USA, or Azure cloud available from Microsoft Corporation of Redmond, WA USA, or Google Cloud Service available from Google of Alphabet Corporation, Mountain View, CA USA, among many other network and software communications offerings available from IBM Corporation, Oracle Corporation, and others.

Computer 300 may also include an input device such as, e.g., (but not limited to) a mouse or other pointing device such as a digitizer, touch-based sensor, and/or a keyboard and/or other data entry device (none of which are labeled).

Computer 300 may also include output devices, such as, e.g., (but not limited to) display 330, and display interface 302. Computer 300 may include input/output (I/O) devices such as, e.g., (but not limited to) communications interface 324, cable 328 and communications path 326, etc. These devices may include, e.g., but not limited to, a network interface card, and modems (neither are labeled). Communications interface 324 may allow software and data to be transferred between computer system 300 and external devices. Examples of communications interface 324 may include, e.g., but may not be limited to, a modem, a network interface (such as, e.g., an Ethernet card), a communications port, a Personal Computer Memory Card International Association (PCMCIA) slot and card, etc. Software and data transferred via communications interface 324 may be in the form of signals 328 which may be electronic, electromagnetic, optical or other signals capable of being received by communications interface 324. These signals 328 may be provided to communications interface 324 via, e.g., but not limited to, a communications path 326 (e.g., but not limited to, a channel). This channel 326 may carry signals 328, which may include, e.g., but not limited to, propagated signals, which may be stored in nontransitory form, and may be implemented using, e.g., but not limited to, wire or cable, local and/or wide area network (LAN/WAN) protocols, Ethernet, Token Ring, FDDI, carried over andy of various physical media, fiber optics, a telephone line, twisted pair, shielded twisted pair, a cellular link, a radio frequency (RF) link, wireless communications, spread spectrum, orthogonal frequency division multiplexing (OFDM), and/or other communications channels, etc.

In this document, the terms "computer program medium" and "computer readable medium" may be used to generally refer to media such as, e.g., but not limited to removable storage drive 314, a hard disk installed in hard disk drive 312, and signals 328, etc. These computer program products may provide software to computer system 300. The invention may be directed to such computer program products.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct or indirect physical or electrical contact with each other. "Coupled" may mean that two or more elements are in direct physical or electrical contact. However, "coupled" may also mean that two or more elements are not in direct contact with each other, but yet still co-operate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments of the present invention may include apparatuses for performing the operations herein. An apparatus may be specially constructed for the desired purposes, or it may comprise a general purpose device modified as set forth herein to perform the processing as described to be selectively activated or reconfigured by a software program stored in the device to become a special purpose device capable of performing the subsystem's or submodule's performance functionality and computer and communications systems instructions, and/or by hardware processing such as, e.g., but not limited to, performing certain trusted platform system processing, including exemplary key based encryption/decryption, network monitoring, packet inspection and the like, according to exemplary embodiments.

Embodiments of the invention may be implemented in one or a combination of hardware, firmware, and software. Embodiments of the invention may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, etc.) when nontransitory, and others.

Computer programs (also called computer control logic), may include object-oriented computer programs, and may be stored in main memory 308 and/or the secondary memory 310 and/or removable storage units 314, also called computer program products. Such computer programs, when executed, may enable the computer system 300 to perform the features of the present invention as discussed herein. In particular, the computer programs, when executed, may enable the processor 304 to provide a method to resolve conflicts during data synchronization according to an exemplary embodiment of the present invention. Accordingly, such computer programs may represent controllers of the computer system 300.

Various artificial intelligence based analysis techniques may be used herein including neural networks, machine learning, any of various well-known AI and ML techniques and processes (e.g., reinforcement learning, dynamic programming, state action reward state action (SARSA), q learning, supervised learning, unsupervised learning, large language models (LLMs), natural language search and interactive request and response, neural networks, convolutional neural networks, statistical heuristics, topic identification and classification, linguistics and semantic processing, Trademarked software TensorFlow and OpenAI libraries, cloud computing services, specific APIs, Microsoft cognitive services, Google cloud AI, Watson AI, offerings from Amazon, Facebook, Baidu, Apple, and others, etc.), and output of such algorithms may be analyzed further as set forth herein to obtain feature vectors and other data which may be used to provide further guidance to users, and/or be integrated for further processing and analysis, authentication, access control, and/or encryption/decryption processing, and coupled via decision support systems, executive information systems, and other graphical user interface enabled network and cyber security monitoring and threat analysis management and processing.

In another exemplary embodiment, the invention may be directed to a computer program product may include a computer readable medium having control logic (computer software) stored therein. The control logic, when executed by the processor 304, may cause the processor 304 to perform the functions of the invention as described herein. In another exemplary embodiment where the invention may be implemented using software, the software may be stored in a computer program product and loaded into computer system 300 using, e.g., but not limited to, removable storage drive 314, hard drive 312 or communications interface 324, etc. The control logic (software), when executed by the processor 304, may cause the processor 304 to perform the functions of the invention as described herein. The computer software may run as a standalone software application program running atop an operating system or may be integrated into the operating system.

In yet another embodiment, the invention may be implemented primarily in hardware using, for example, but not limited to, hardware components such as application specific integrated circuits (ASICs), or one or more state machines, etc. Implementation of the hardware state machine so as to perform the functions described herein will be apparent to persons skilled in the relevant art(s).

In another exemplary embodiment, the invention may be implemented primarily in firmware.

In yet another exemplary embodiment, the invention may be implemented using a combination of any of, e.g., but not limited to, hardware, firmware, and software, etc.

Exemplary embodiments of the invention may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, etc.), and others.

According to an exemplary embodiment, the application system can include an electronic decision support system (DSS) (not shown), policy-based trust platform systems, which can interact, e.g., but not limited to, with computer database management system (DBMS) 307, and/or electronic interactive, graphical user interface (GUI) system. Each of the exemplary DSS, DBMS and/or EIGUI system, can then, using e.g., but not limited to, a cryptographic processor and/or a crypto chip controller processor 336, or the like, can then encrypt the data using electronic encryptor, which can make use of one or more cryptographic algorithm electronic logic, which can include encryption code, a cryptographic combiner, etc., and may be stored in encrypted form, according to an exemplary embodiment, in a computer database storage facility, from computer database storage device, and from there the process can continue with use of the cryptographic algorithm electronic logic, and electronic decryptor, which can decrypt and/or provide a process for decrypting encrypted data, and/or by providing such data to the DSS, the DBMS, or the EIGUI, if authorized. By using encryption/decryption, certain algorithms can be used, as described herein, including, e.g., but not limited to, checksum, AES encryption, RSA, PKI, TLS, FTPS, SFTP, etc. and/or other cryptographic algorithms and/or protocols, according to exemplary embodiments.

Cryptographic Functions

Cryptographic systems, according to an exemplary embodiment, can provide one or more of the following four example services. It is important to distinguish between these, as some algorithms are more suited to particular tasks, but not to others. To protect patient data, personal data can be encrypted prior to storage and can be decrypted before accessing the data, according to an exemplary embodiment. When analyzing requirements and risks, one needs to decide which of the four functions should be used to protect the proprietary data, according to an exemplary embodiment.

Authentication

Using a cryptographic system, according to an exemplary embodiment, one can establish the identity of a remote user (or system). A typical example is the SSL certificate of a web server providing proof to the user device that user device is connected to the correct server, according to an exemplary embodiment.

The identity is not of the user, but of the cryptographic key of the user. Having a less secure key lowers the trust one can place on the identity, according to an exemplary embodiment.

Non-Repudiation

The concept of non-repudiation is particularly important for financial or e-commerce applications, according to an exemplary embodiment. Often, cryptographic tools are required to prove that a unique user has made a transaction request, according to an exemplary embodiment. It must not be possible for the user to refute his or her actions, according to an exemplary embodiment.

For example, a customer can request a transfer of money from her account to be paid to another account, according to an exemplary embodiment. Later, she claims never to have made the request and demands the money be refunded to the account. If one has non-repudiation through cryptography, one can prove—usually through digitally signing the transaction request, that the user authorized the transaction.

Confidentiality

More commonly, the biggest concern can be to keep information private, according to an exemplary embodiment. Cryptographic systems, according to an exemplary embodiment, have been developed to function in this capacity. Whether it be passwords sent during a log on process, or storing confidential proprietary financial data in a database, encryption can assure that only users who have access to the appropriate key can get access to the proprietary data.

Integrity

One can use cryptography, according to an exemplary embodiment, to provide a means to ensure data is not viewed or altered during storage or transmission. Cryptographic hashes for example, can safeguard data by providing a secure checksum, according to an exemplary embodiment.

Cryptographic Algorithms

Various types of cryptographic systems exist that have different strengths and weaknesses, according to an exemplary embodiment. Typically, the exemplary cryptographic systems can be divided into two classes; 1) those that are strong, but slow to run, and 2) those that are quick, but less secure. Most often a combination of the two approaches can be used, according to an exemplary embodiment (e.g.: secure socket layer (SSL)), whereby we establish the connection with a secure algorithm, and then if successful, encrypt the actual transmission with the weaker, but much faster algorithm.

Symmetric Cryptography

Symmetric Cryptography, according to an exemplary embodiment, is the most traditional form of cryptography. In a symmetric cryptosystem, the involved parties share a common secret (password, pass phrase, or key), according to an exemplary embodiment. Data can be encrypted and decrypted using the same key, according to an exemplary embodiment. These symmetric cryptography algorithms tend to be comparatively fast, but the algorithms cannot be used unless the involved parties have already exchanged keys, according to an exemplary embodiment. Any party possessing a specific key can create encrypted messages using that key as well as decrypt any messages encrypted with the key, according to an exemplary embodiment. In systems involving a number of users who each need to set up independent, secure communication channels, symmetric cryptosystems can have practical limitations due to the requirement to securely distribute and manage large numbers of keys, according to an exemplary embodiment.

Common examples of symmetric algorithms include, e.g., but not limited to, DES, 3DES and/or AES, etc. The 56-bit keys used in DES are short enough to be easily brute-forced by modern hardware and DES should no longer be used, according to an exemplary embodiment. Triple DES (or 3DES) uses the same algorithm, applied three times with different keys giving it an effective key length of 128 bits, according to an exemplary embodiment. Due to the problems using the DES algorithm, the United States National Institute of Standards and Technology (NIST) hosted a selection process for a new algorithm. The winning algorithm was Rijndael and the associated cryptosystem is now known as the Advanced Encryption Standard or AES, according to an exemplary embodiment. For most applications 3DES, according to an exemplary embodiment, is acceptably secure at the current time, but for most new applications it is advisable to use AES, according to an exemplary embodiment.

Asymmetric Cryptography (Also Called Public/Private Key Cryptography)

Asymmetric algorithms, according to an exemplary embodiment, use two keys, one to encrypt the data, and either key to decrypt. These inter-dependent keys are generated together, according to an exemplary embodiment. One key is labeled the Public key and is distributed freely, according to an exemplary embodiment. The other key is labeled the Private Key and must be kept hidden, according to an exemplary embodiment. Often referred to as Public/Private Key Cryptography, these cryptosystems can provide a number of different functions depending on how they are used, according to an exemplary embodiment.

The most common usage of asymmetric cryptography is to send messages with a guarantee of confidentiality, according to an exemplary embodiment. If User A wanted to send a message to User B, User A would get access to User B's publicly available Public Key, according to an exemplary embodiment. The message is then encrypted with this key and sent to User B, according to an exemplary embodiment. Because of the cryptosystem's property that messages encoded with the Public Key of User B can only be decrypted with User B's Private Key, only User B can read the message, according to an exemplary embodiment.

Another usage scenario is one where User A wants to send User B a message and wants User B to have a guarantee that the message was sent by User A, according to an exemplary embodiment. In order to accomplish this, User A can encrypt the message with their Private Key, according to an exemplary embodiment. The message can then only be decrypted using User A's Public Key, according to an exemplary embodiment. This can guarantee that User A created the message because User A is then the only entity who had access to the Private Key required to create a message that can be decrypted by User A's Public Key, according to an exemplary embodiment. This is essentially a digital signature guaranteeing that the message was created by User A, according to an exemplary embodiment.

A Certificate Authority (CA), whose public certificates are installed with browsers or otherwise commonly available, may also digitally sign public keys or certificates, according to an exemplary embodiment. One can authenticate remote systems or users via a mutual trust of an issuing CA, according to an exemplary embodiment. One can trust their 'root' certificates, according to an exemplary embodiment, which in turn authenticates the public certificate presented by the server.

PGP and SSL are prime examples of systems implementing asymmetric cryptography, using RSA and/or other algorithms, according to an exemplary embodiment.

Hashes

Hash functions, according to an exemplary embodiment, take some data of an arbitrary length (and possibly a key or password) and generate a fixed-length hash based on this input. Hash functions used in cryptography have the property that it can be easy to calculate the hash, but difficult or impossible to re-generate the original input if only the hash value is known, according to an exemplary embodiment. In addition, hash functions useful for cryptography have the property that it is difficult to craft an initial input such that the hash will match a specific desired value, according to an exemplary embodiment.

MD5 and SHA-1 are common hashing algorithms, according to an exemplary embodiment. These algorithms are considered weak and are likely to be replaced in due time after a process similar to the AES selection, according to an exemplary embodiment. New applications should consider using SHA-256 instead of these weaker algorithms, according to an exemplary embodiment.

Key Exchange Algorithms

There are also key exchange algorithms (such as Diffie-Hellman for SSL), according to an exemplary embodiment. These key exchange algorithms can allow use to safely exchange encryption keys with an unknown party, according to an exemplary embodiment.

Algorithm Selection

As modern cryptography relies on being computationally expensive to break, according to an exemplary embodiment, specific standards can be set for key sizes that can provide assurance that with today's technology and understanding, it will take too long to decrypt a message by attempting all possible keys, according to an exemplary embodiment.

Therefore, we need to ensure that both the algorithm and the key size are taken into account when selecting an algorithm, according to an exemplary embodiment.

FIG. 4 depicts an example application server and web server network architecture including an example fully meshed, redundant communications network load balancing application server architecture as may be used for an example SMARTHUB system service provider and/or a digital financial services and/or payment service provider, and may couple client devices such as, e.g., but not limited to, service provider, buyer devices, supplier devices, public blockchain, proxy NFT systems, data repository systems, authentication systems, ledger tracking systems, blockchain distributed ledge systems, NFT systems, SMARTPASS NFT authentication systems, notification systems, request response systems, financing request systems, collateralized NFT request response systems, etc. to example service devices using an example network infrastructure, according to an example embodiment of the present invention. FIG. 4 depicts an exemplary schematic block diagram 400 illustrating an exemplary communications network device hardware architecture 400 showing exemplary network devices including exemplary application server devices 402, exemplary storage devices 406, web server devices 408, all coupled to an exemplary communications network 404, which may be coupled to other devices such as, e.g., but not limited to, a cyber security network security operations environment device or devices 404, and other end user and other internal and/or external user computing and/or communications devices 410, which may be coupled to the network communications environment 404 by one or more physical devices not shown, such as, e.g., but not limited to, network interface cards (NICs), wireless local area network WLAN or wireless fidelity (WI-FI) (IEEE 802.11 communication technologies), physical wires, twisted pair, coaxial cable, fiber optic cable, and/or other communications network cabling, wireless communication access points and/or wireless antennae, wires, wireless media, routers, gateways, access points, exchange carrier facilities, modulator/demodulator (modems), modulating equipment, cellular network exchange devices, etc. Block diagram 400 may serve as an exemplary logical diagram of associated physical devices. Physical devices may communicate via one or more communications network software protocols via exemplary protocol languages or stacks which may correlate to the Open Systems Interconnect (OSI) stack of communication layers, such as, e.g., but not limited to, Internet Protocol (IP), transmission control protocol (TCP), among various other protocols including, e.g., but not limited to, TCP/IP protocols, UDP, hypertext transfer protocol (HTTP), file transfer protocol (FTP), security protocols (e.g., HTTPS, SFTP, FTPS, TLS, etc.), as will be apparent to those skilled in the relevant art. Various load sharing devices and port sharing devices may be used, as well as protocol tracing and packet tracing devices, which may be able to access such communications data and perform exemplary processing including packet inspection, deep packet inspection, network tracing, packet inspection (e.g., source and destination address, etc.) and the like. Such systems may be used to perform various blockchain related distributed ledger technologies so as to replicate data which may be encrypted and decrypted using various algorithms. Certain algorithms may be used which may be resilient to conventional decryption techniques, resilient to brute force attack decryption techniques, and/or may be resilient to quantum computing based decryption techniques. Such software and hardware network analysis and/or processing tools may be used to process communications network traffic internal to, and/or external from an exemplary entity organization and an exemplary network operations center (NOC) network monitoring organization may be able to analyze such network traffic to, e.g., process different types of traffic, using various sophisticated network operations tools and techniques as well as to perform various automated processing as described further herein.

Although example embodiments of the invention are illustrated and described herein as embodied in an example SMARTPASS as a digital asset model for collateralized non-fungible token, the invention should not be limited to the details shown in those example embodiments because various modifications and structural changes may be made without departing from the spirit of the invention while remaining within the scope and range of equivalents of the claims.

The construction and method of operation of various example embodiments of the claimed invention and additional features and/or advantages of various example embodiments of the invention are best understood from the following description of specific example embodiments when read in connection with the accompanying drawings.

Various exemplary embodiments of the invention are discussed in detail herein. While specific exemplary embodiments are discussed herein, it should be understood that this is done for illustration purposes only. A person skilled in the relevant art will recognize that other components and configurations can be used without parting from the spirit and scope of the invention.

What is claimed is:

1. A computer implemented method of processing comprising electronically creating at least one electronic non-fungible token (NFT) with electronically computed estimated value comprising at least one electronic computer processor coupled to at least one electronic memory storage device and coupled via at least one electronic communications interface to at least one electronic data communications network, the method comprising:

electronically receiving, by the at least one electronic computer processor of at least one private electronic computer private blockchain system, at least two electronic requests to at least one of electronically validate, electronically authorize, or electronically authenticate, at least one electronic device of a plurality of members and at least one electronic purchase reporting request from at least one electronic buyer party device of a first of said at least one electronic device of the plurality of members and at least one electronic financing request from at least one electronic supplier party device of a second of said at least one electronic device of the plurality of members, wherein at least both of said first and said second of said at least one electronic device of the plurality of members are engaged in at least one electronic trade transaction over, and are electronically coupled to said at least one private electronic computer private blockchain system, via, the at least one electronic data communications network;

electronically determining, by the at least one electronic computer processor, whether at least one electronic request from said at least one electronic buyer party device of a buyer and at least one electronic request from said at least one electronic device seller party device of a seller are electronically validated, electronically authorized, and electronically authenticated, and if so, electronically performing a plurality of electronic processing instructions comprising at least one or more of:

electronically creating, by the at least one electronic computer processor, the at least one electronic non-fungible token (NFT) with electronically computed estimated value on the at least one electronic purchase reporting request and an initial electronic data state;

electronically saving and electronically minting, by the at least one electronic computer processor, the at least one electronic nonfungible token (NFT), and electronically assigning, by the at least one electronic computer processor, an initial electronic NFT value and the initial electronic data state;

electronically computing, by the at least one electronic computer processor, an electronically estimated value based on the at least one electronic purchase reporting request, electronically computing, by the at least one electronic computer processor, at least one or more of electronic data indicative of an estimated tariff and at least one or more of:

taxes, or other fees;

electronically updating, by the at least one electronic computer processor, at least one electronic database (DB) of the at least one electronic nonfungible token (NFT), the at least one electronic NFT, and the initial electronic NFT value with an updated electronic NFT value and an updated electronic data state;

electronically determining, by the at least one electronic computer processor, if electronic financing is electronically requested, and if electronic financing is electronically determined to be electronically requested, then electronically performing, by the at least one electronic computer processor:

a) electronically posting, by the at least one electronic computer processor, an electronic NFT proxy to a second electronic blockchain public limited access electronic NFT electronic repository, b) electronically notifying, by the at least one electronic computer processor, at least one electronic device of involved parties of electronic financing options, and c) electronically notifying, by the at least one electronic computer processor, at least one electronic device of at least one or more of:

FinTech,

DeFi, or decentralized Lenders; or if electronic financing is not electronically requested then electronically notifying, by the at least one electronic computer processor, the at least one electronic device of the at least one or more of:

FinTech,

DeFi, or decentralized Lenders.

2. A system of electronically processing comprising electronically creating at least one electronic nonfungible token (NFT) with electronically computed estimated value, the system comprising:

at least one electronic computer processor of at least one private electronic computer private blockchain, coupled to at least one electronic memory storage device and coupled via at least one electronic communications interface, coupled to at least one electronic data communications network, the system comprising wherein said at least one electronic computer processor is configured to:

electronically receive at least two electronic requests to at least one of electronically validate, electronically authorize, or electronically authenticate, at least one electronic device of a plurality of members and at least one electronic purchase reporting request from at least one electronic buyer party device and at least one electronic financing request from at least one electronic supplier party device, wherein at least both of said first and said second of said at least one electronic device of the plurality of members are engaged in at least one electronic trade transaction over the at least one electronic data communications network;

electronically determine if the at least one electronic request from the buyer party device of a buyer and at least one electronic request from a seller party device of a seller are electronically validated, electronically authorized, and electronically authenticated, and if so, perform a plurality of processing instructions comprising at least one or more of configuring the at least one electronic computer processor to be configured to:

electronically create the at least one electronic nonfungible token (NFT) with electronically computed estimated value on the at least one electronic purchase reporting request and an initial electronic data state;

electronically save and electronically mint the at least one electronic nonfungible token (NFT), and electronically assign an initial electronic NFT value and initial electronic data state;

electronically compute at least the electronically estimated value based on the at least one electronic purchase reporting request, electronically compute at least one or more of electronic data indicative of an estimated tariff at least one or more of:

tax, or other fees;

electronically update at least one electronic database (DB) of the at least one nonfungible token (NFT), the at least one electronic NFT, and the initial electronic NFT value with an updated electronic NFT value and an updated electronic data state;

electronically determine if electronic financing is requested, and if electronic financing is electronically determined to be electronically requested, then electronically configure to electronically perform:

a) electronically post an electronic NFT proxy to a second electronic blockchain public limited access electronic NFT electronic repository, b) electronically notify at least one electronic device of involved parties of electronic financing options, and c) electronically notify the at least one electronic device of the at least one or more of:

FinTech,

DeFi, or decentralized Lenders; or if electronic financing is electronically determined to be not electronically requested, then electronically notify the at least one electronic device of the at least one or more of:

FinTech,

DeFi, or decentralized Lenders.

3. A computer program product embodied on an electronic computer accessible nontransitory storage medium, including at least one electronic instruction, which when executed on at least one electronic computer processor of at least one private electronic computer private blockchain system performs a method of electronically processing comprising electronically creating at least one nonfungible token (NFT) with electronically computed estimated value comprising:

electronically receiving at least two electronic requests to at least one of electronically validate, electronically authorize, or electronically authenticate, at least one electronic device of a plurality of members and at least one electronic purchase reporting request from at least one electronic buyer party device and one electronic financing request from at least one electronic supplier party device over the at least one electronic data communications network;

electronically determining if the at least one electronic request from said at least one electronic buyer party device of a buyer and at least one electronic request from said at least one electronic seller party device of a seller are electronically validated, electronically authorized, and electronically authenticated, and if so, electronically performing a plurality of electronic processing instructions comprising at least one or more of:

electronically creating the at least one electronic nonfungible token (NFT) with electronically computed estimated value on the at least one electronic purchase reporting request and an initial electronic data state;

electronically saving and electronically minting the at least one electronic nonfungible token (NFT) as at least one electronic non-fungible token (NFT), and assigning, by the at least one electronic computer processor, an initial electronic NFT value and an initial electronic data state;

electronically computing at least the electronically estimated value on the at least one electronic purchase reporting request, electronically computing at least one or more of electronic data indicative of an estimated tariff and at least one or more of:

taxes, or other fees;

electronically updating at least one electronic database (DB) of the at least one electronic nonfungible token (NFT), the at least one electronic NFT, and the initial electronic NFT value with an updated electronic NFT value and an updated electronic data state;

electronically determining if electronic financing is electronically requested, and if electronic financing is electronically determined to be electronically requested, then electronically performing:

a) electronically posting an electronic NFT proxy to a second electronic blockchain public limited access electronic NFT electronic repository, b) electronically notifying involved parties of financing options, and c) electronically notifying at least one electronic device of at least one or more of:

FinTech,

DeFi, or decentralized Lenders; or if electronic financing is not requested then electronically notifying the at least one electronic device of the at least one or more of:

FinTech,

DeFi, or decentralized Lenders.

4. The method according to claim 1, wherein, the at least one electronic device supplier party device and the at least one electronic device seller party device comprises at least one or more of:

a same electronic device; or different electronic devices.

5. The method according to claim 1, further comprising:

electronically providing by at least one electronic custom regulations requirements electronic server electronic data to be used in said electronic creating.

6. The method according to claim 1, wherein said electronically receiving of said at least one electronic financing request from said at least one electronic seller party device of the seller, comprises at least one or more of:

electronically receiving said at least one electronic financing request from said at least one electronic supplier party device at said at least one private electronic computer private blockchain system; or electronically receiving at least one electronic request for a collateralized electronic NFT from said at least one electronic supplier party device at said at least one private electronic computer private blockchain system.

7. The method according to claim 1, further comprising at least one or more of:

electronically recording, by said at least one private electronic computer private blockchain system, an electronic proxy NFT to a public electronic blockchain ledger;

electronically notifying, by said at least one private electronic computer private blockchain system, electronic digital financial services of said at least one nonfungible token (NFT);

electronically notifying, by said at least one private electronic computer private blockchain system, said at least one electronic buyer party device of said at least one nonfungible token (NFT); or electronically requesting early electronic payment, by said at least one private electronic computer private blockchain system, from said at least one electronic buyer party device; or electronically receiving an electronic validation of said at least one nonfungible token (NFT), by said at least one private electronic computer private blockchain system, from the electronic digital financial services device.

8. The system according to claim 2, wherein, the at least one electronic supplier party device and the at least one electronic seller party device comprises at least one or more of:

a same electronic device; or different electronic devices.

9. The system according to claim 2, further comprising:

wherein the at least one electronic computer processor is configured to electronically provide by at least one electronic custom regulations requirements electronic server electronic data to be used in said electronic creating.

10. The system according to claim 2, wherein said wherein the at least one electronic computer processor configured to electronically receive of said at least one electronic financing request from said at least one electronic seller party device of the seller, comprises wherein the at least one electronic processor is configured to at least one or more of:

electronically receive said at least one electronic financing request from said at least one electronic supplier party device at said at least one private electronic computer private blockchain system; or electronically receive an electronic request for a collateralized electronic NFT from said at least one electronic supplier party device at said at least one private electronic computer private blockchain system.

11. The system according to claim 2, further comprising wherein the at least one electronic computer processor is configured to at least one or more of:

electronically record, by said at least one private electronic computer private blockchain system, an electronic proxy NFT to a public electronic blockchain ledger;

electronically notify, by said at least one private electronic computer private blockchain system, at least one electronic digital financial services of said at least one electronic nonfungible token (NFT);

electronically notify, by said at least one private electronic computer private blockchain system, said at least one electronic buyer party device of said at least one nonfungible token (NFT); or electronically request electronic early payment, by said at least one private electronic computer private blockchain system, from said at least one electronic buyer party device; or electronically receive at least one electronic validation of said at least one nonfungible token (NFT), by said at least one private electronic computer private electronic blockchain system, from the at least one electronic digital financial services device.

12. The computer program product according to claim 3, wherein the method comprises, wherein the at least one electronic supplier party device and the at least one electronic seller party device comprises at least one or more of:

a same electronic device; or different electronic devices.

13. The computer program product according to claim 3, wherein the method further comprises:

electronically providing by at least one electronic custom regulations requirements electronic server electronic data to be used in said electronically creating.

14. The computer program product according to claim 3, wherein the method comprises, wherein said electronically receiving of said at least one electronic financing request from said at least one electronic seller party device of the seller, comprises at least one or more of:

electronically receiving said at least one electronic financing request from said at least one electronic supplier party device at said at least one private electronic computer private blockchain system; or electronically receiving at least one electronic request for an electronic collateralized NFT from said electronic supplier party device at said at least one private electronic computer private blockchain system.

15. The computer program product according to claim 3, wherein the method further comprises at least one or more of:

electronically recording, by said at least one private electronic computer private blockchain system, an electronic proxy NFT to a public electronic blockchain ledger;

electronically notifying, by said at least one private electronic computer private blockchain system, at least one electronic digital financial services device of said at least one nonfungible token (NFT);

electronically notifying, by said at least one private electronic computer private blockchain system, said at least one electronic buyer party device of said at least one nonfungible token (NFT); or electronically requesting electronic early payment, by said at least one private electronic computer private blockchain system, from said at least one electronic buyer party device; or electronically receiving at least one electronic validation of said electronic NFT, by said at least one private electronic computer private electronic blockchain system, from the at least one electronic digital financial services device.

16. The method according to claim 1, wherein said electronic NFT value of said at least one electronic nonfungible token (NFT) does not fluctuate as said electronic NFT is collateralized to an electronic invoice and electronically saves electronic data indicative of agreed upon terms electronically provided by the at least one electronic buyer device or by the at least one electronic seller device comprising the electronic data indicative of agreement between the buyer and seller.

17. The method according to claim 1, wherein said electronically saving of said electronic NFT comprises electronic data indicative of saving said electronic NFT in compliance with electronic data indicative of a standard ERC-1155 electronic Non-fungible token specification.

18. The method according to claim 1, further comprising:

electronically recording on a new electronic block on the electronic public distributed ledger, electronic data indicative of a unique identifier for the at least one nonfungible token (NFT);

electronically verifying the electronic blockchain address; and electronically monitoring for any electronic data indicative of transactions.

19. The method according to claim 1, wherein said electronically receiving or electronically updating, comprises wherein said electronically receiving or electronically updating comprises at least one or more of:

electronically receiving, by at least one electronic graphical user interface (GUI) executed by the at least one electronic computer processor, via the at least one electronic graphical user interface (GUI) comprising at least one electronic graphical user interface (GUI) element to enable electronically receiving the at least one electronic purchase reporting request and the at least one electronic financing request;

electronically receiving, via at least one electronic interactive, graphical user interface (EIGUI) system, by the at least one electronic computer processor of the at least one private electronic computer private blockchain system, the at least two electronic requests to at least one of electronically validate, electronically authorize, or electronically authenticate, via at least one electronic cryptographic processor configured to at least one or more of encrypt or decrypt at least one data, of the at least one electronic device of the plurality of members and the at least one electronic purchase reporting request from the at least one electronic buyer party device of the first of said at least one electronic device of the plurality of members and the at least one electronic financing request from the at least one electronic supplier party device of the second of said at least one electronic device of the plurality of members, wherein at least both of said first and said second of said at least one electronic device of the plurality of members are engaged in the at least one electronic trade transaction over, and are electronically coupled to said at least one private electronic computer private blockchain system, via, the at least one electronic data communications network;

electronically providing at least one electronic artificial intelligence (AI) or electronic machine learning (ML) system comprising at least one electronic graphical user interface (GUI) configured to electronically provide at least one of electronic authentication, electronic access control, or electronic encryption/decryption processing, electronically coupled via at least one electronic decision support system and at least one graphical user interface including at least one or more of at least one electronic large language model (LLM), electronic supervised learning, electronic unsupervised learning, electronic neural network, or electronic convolutional neural network enabling electronic authorization, electronic validation or electronic authentication;

wherein the at least one private electronic computer private blockchain system comprises at least one electronic graphical user interface (GUI); or electronically updating, by the at least one electronic computer processor, the at least one electronic database (DB) of the at least one electronic nonfungible token (NFT), the at least one electronic NFT, and the initial electronic NFT value with the updated electronic NFT value and the updated electronic data state, comprises electronically comprising at least one or more of an electronic decision support system (DSS), at least one electronic policy-based trust platform system, at least one electronic data encryptor, at least one electronic data decryptor, the at least one electronic databased comprising at least one computer database management system (DBMS), or at least one electronic interactive graphical user interface (GUI) system.

20. The method according to claim 19, wherein at least one of said electronically posting or said electronically notifying comprises wherein said electronically posting or said electronically notifying comprises:

electronically posting or electronically notifying, by the at least one graphical user interface executed by the at least one electronic computer processor, via the at least one graphical user interface.

* * * * *